(12) United States Patent
Qiu et al.

(10) Patent No.: US 8,839,670 B2
(45) Date of Patent: Sep. 23, 2014

(54) ANCHOR-TILT CANCELLING ACCELEROMETER

(75) Inventors: Jin Qiu, Sunnyvale, CA (US); Joe Seeger, Menlo Park, CA (US); Alexander Castro, San Francisco, CA (US); Igor Tchertkov, Pleasanton, CA (US); Richard Li, Mountain View, CA (US)

(73) Assignee: Invensense, Inc., San Jose, CA (US)

( * ) Notice: Subject to any disclaimer, the term of this patent is extended or adjusted under 35 U.S.C. 154(b) by 291 days.

(21) Appl. No.: 13/249,902

(22) Filed: Sep. 30, 2011

(65) Prior Publication Data

US 2012/0125104 A1    May 24, 2012

Related U.S. Application Data

(60) Provisional application No. 61/416,943, filed on Nov. 24, 2010.

(51) Int. Cl.
  *G01P 15/125*   (2006.01)
  *G01P 21/00*   (2006.01)

(52) U.S. Cl.
  CPC ............... *G01P 15/125* (2013.01); *G01P 21/00* (2013.01)
  USPC .................................... 73/514.32; 73/514.38

(58) Field of Classification Search
  USPC ............... 73/514.32, 514.38, 514.16, 514.36, 73/514.33
  See application file for complete search history.

(56) References Cited

U.S. PATENT DOCUMENTS

| | | | | |
|---|---|---|---|---|
| 5,824,901 | A * | 10/1998 | van Seeters | 73/514.32 |
| 6,082,197 | A * | 7/2000 | Mizuno et al. | 73/514.36 |
| 6,158,280 | A * | 12/2000 | Nonomura et al. | 73/504.04 |
| 6,739,193 | B2 * | 5/2004 | Franz et al. | 73/514.29 |
| 6,845,670 | B1 * | 1/2005 | McNeil et al. | 73/514.32 |
| 7,022,543 | B2 * | 4/2006 | Eskridge et al. | 438/52 |
| 7,210,352 | B2 * | 5/2007 | Foster et | 73/514.32 |
| 7,487,661 | B2 * | 2/2009 | Ueda et al. | 73/1.39 |
| 7,578,190 | B2 * | 8/2009 | Lin et al. | 73/514.29 |
| 7,600,428 | B2 * | 10/2009 | Robert et al. | 73/514.32 |
| 7,610,809 | B2 * | 11/2009 | McNeil et al. | 73/514.32 |
| 8,020,443 | B2 * | 9/2011 | Lin et al. | 73/514.32 |
| 8,056,415 | B2 * | 11/2011 | McNeil et al. | 73/514.32 |
| 8,272,268 | B2 * | 9/2012 | Classen et al. | 73/514.32 |
| 8,333,113 | B2 * | 12/2012 | Classen et al. | 73/514.32 |
| 2005/0005698 | A1 * | 1/2005 | McNeil et al. | 73/514.32 |
| 2009/0241662 | A1 * | 10/2009 | Supino et al. | 73/504.12 |
| 2009/0308159 | A1 * | 12/2009 | Frey et al. | 73/514.32 |
| 2010/0186508 | A1 * | 7/2010 | Guenther et al. | 73/504.14 |
| 2012/0186346 | A1 * | 7/2012 | McNeil et al. | 73/514.32 |

* cited by examiner

*Primary Examiner* — Helen Kwok
(74) *Attorney, Agent, or Firm* — Maryam Imam; IPxLaw Group LLP

(57) ABSTRACT

Described herein is an accelerometer that can be sensitive to acceleration, but not anchor motion due to sources other than acceleration. The accelerometer can employ a set of electrodes and/or transducers that can register motion of the proof mass and support structure and employ and output-cancelling mechanism so that the accelerometer can distinguish between acceleration and anchor motion due to sources other than acceleration. For example, the effects of anchor motion can be cancelled from an output signal of the accelerometer so that the accelerometer exhibits sensitivity to only acceleration.

19 Claims, 6 Drawing Sheets

ANCHOR-TILT CANCELLING ACCELEROMETER

CROSS REFERENCE TO RELATED APPLICATIONS

The subject application claims the priority of and expressly incorporates by reference the following application: U.S. Provisional Patent Application Ser. No. 61/416,943, entitled "ANCHOR-TILT CANCELLING ACCELEROMETER," which was filed on Nov. 24, 2010.

TECHNICAL FIELD

Described herein is an accelerometer that implements an offset cancelling mechanism, which allows the accelerometer to be responsive to acceleration without being responsive to anchor motion.

BACKGROUND

Accelerometers (e.g., X-, Y- or Z-accelerometers) can utilize a proof-mass attached to a mechanical anchor. In the event of acceleration in a direction (e.g., X-, Y- or Z-acceleration), the proof mass can move accordingly, and the electronics can produce an output signal proportional to the acceleration. The mechanical anchors used in such accelerometers can move because of temperature change, packaging stress, material creep, mechanical shock and other reasons. Motion of the anchors will cause motion of the proof mass attached to it, which will generate a false signal that is indistinguishable from the signal caused by acceleration.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The accelerometer (e.g., an X-, Y- or Z-accelerometer) described herein can include a mechanical structure, at least two transducers and/or electrodes, and a signal processing circuit. The mechanical structure can include a substrate, an anchor coupled to the substrate, a support arm rigidly coupled to the anchor, and at least one proof mass flexibly coupled to the support arm. The at least one proof mass moves in response to acceleration.

The accelerometer can have any number of electrodes and/or transducers (e.g. two, four, six, etc.). Two transducers and/or electrodes will be described herein for simplicity of explanation. The first transducer and/or electrode can measure a first distance between a reference area and a first portion of the mechanical structure. The second transducer and/or electrode can measure a second distance between a second reference area and a second portion of the mechanical structure. The signal processing circuit can be coupled to the two transducers and/or electrodes and can produce an output responsive to acceleration and not responsive to anchor motion based on the first distance and the second distance.

The following description and annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
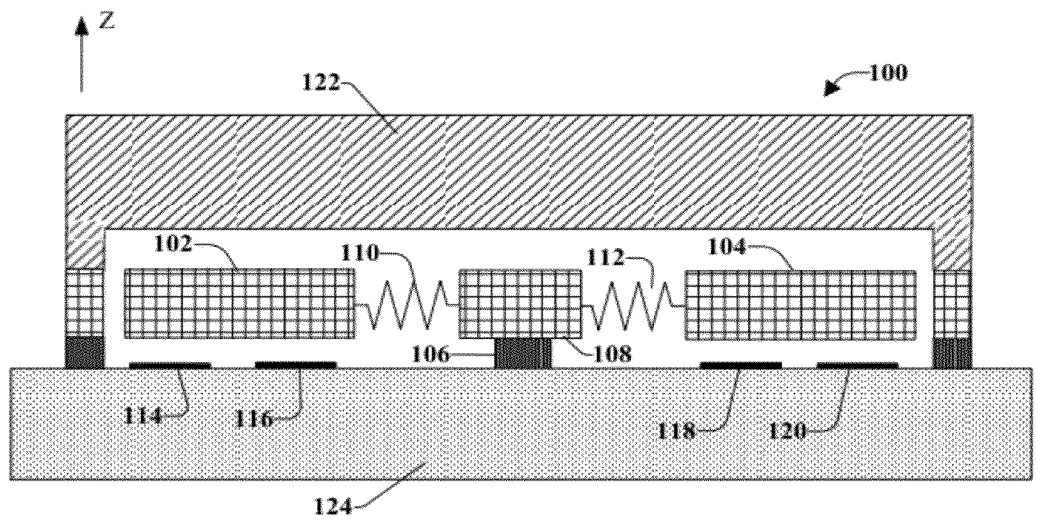
FIG. 1 is a schematic block diagram illustration of a cross section of an example Z accelerometer with two proof masses attached to a bottom substrate not undergoing anchor motion or acceleration.

Various non-limiting embodiments of accelerometer articles of manufacture, systems, apparatuses and methods presented herein can sense acceleration without the effects of anchor motion. In the following description, numerous specific details are set forth in order to provide a thorough understanding of one or more embodiments. One skilled in the relevant art will recognize, however, that the techniques described herein can be practiced without one or more of the specific details, or with other methods, components, materials, etc., and is not limited by these specific details and examples. In other instances, well-known structures, materials, and/or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The subject application relates to systems, apparatuses and articles of manufacture (e.g., accelerometers) that can sense acceleration without the effects of anchor motion due to sources such as temperature change, packaging stress, material creep, mechanical shock, and the like. The subject application also relates to methods for using such accelerometers.

Conventional accelerometers can be susceptible to erroneous acceleration outputs caused by anchor motion due to these sources because conventional accelerometers are unable to distinguish between signal caused by acceleration and signal caused by anchor motion. Different from conventional structures, the accelerometer described herein can include a mechanical structure disposed in a plane, wherein at least one proof mass can rotate out of the plane in response to acceleration normal to the plane. The accelerometer can include at least two transducers that can measure distances normal to the plane and a signal processor that can output an acceleration signal based on the distances. The acceleration and/or distances can be in any direction with regard to the plane, such as normal to the plane, parallel to the plane or in any other direction with respect to the plane. These configurations allow the accelerometer to detect acceleration without detecting anchor motion.

According to an embodiment as schematically illustrated in FIG. 1, the Z accelerometer 100 employs an offset cancelling mechanism that can overcome the limitation of conventional accelerometers. FIG. 1 is a schematic illustration of a cross section of the Z accelerometer 100 with the Z-direction pointing up. Conventionally in the MEMS art "the Z accelerometer" refers to an accelerometer measuring acceleration substantially perpendicular to a MEMS substrate. The accelerometer 100 can employ a first proof mass 102 and a second proof mass 104 attached to a support structure 108 which is further attached through the mechanical anchor 106 to a bottom substrate 124.

Figure 2:
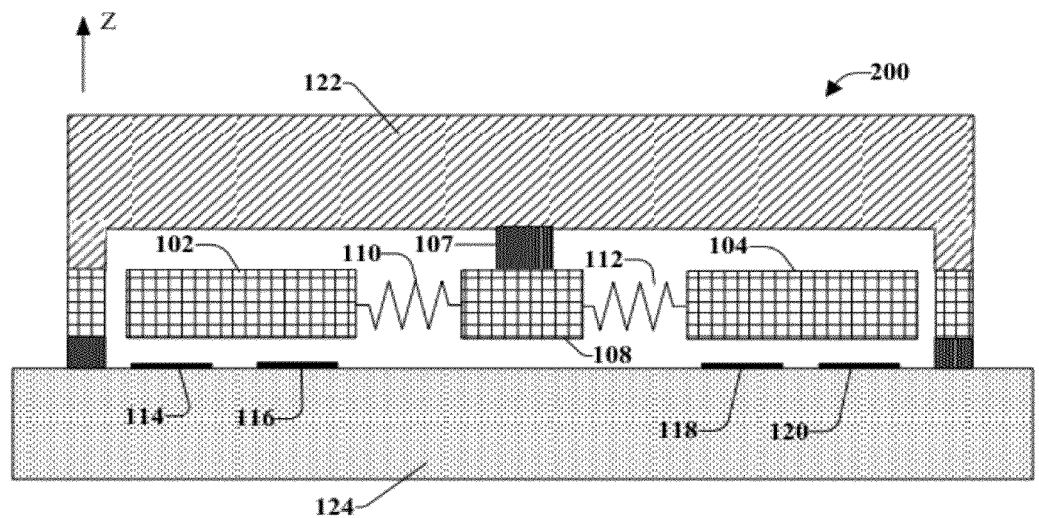
FIG. 2 is a schematic block diagram illustration of a cross section of an example Z accelerometer with two proof masses attached to a top substrate, not undergoing anchor motion or acceleration.
Figure 3:
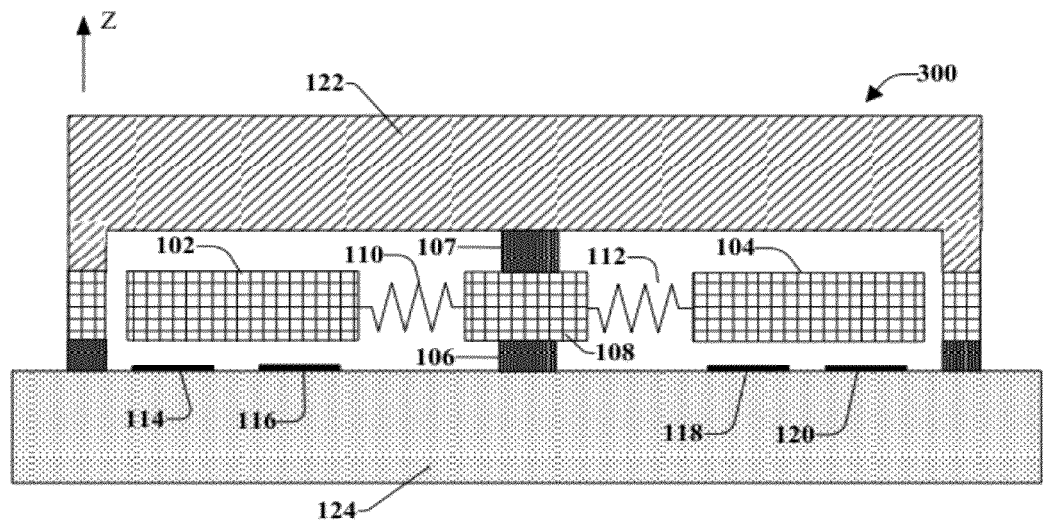
FIG. 3 is a schematic block diagram illustration of a cross section of an example Z accelerometer with two proof masses attached to a top and bottom substrate, not undergoing anchor motion or acceleration.

The first proof mass 102 is attached to the support structure 108 by a first flexible member (e.g., a spring) 110. The second proof mass 104 is attached to the support structure 108 by a second flexible member (e.g., a spring) 112. The support structure 108 can be attached to a bottom substrate 124 through the mechanical anchor 106, as illustrated in FIG. 1. The support structure 108 can also be attached to a top substrate 122, for example by the anchor 107 as illustrated in FIG. 2. Additionally or alternatively, the support structure 108 can be attached to both the top substrate 122 and the bottom substrate 124, for example through anchors 106 and 107, respectively, as illustrated in FIG. 3.

Referring back to FIG. 1, capacitor $C_1$ is formed between the proof mass 102 and a first set of fixed electrodes 114. Similarly, capacitor $C_2$ is formed between the proof mass 102 and a second set of fixed electrodes 116; capacitor $C_3$ is formed between the proof mass 104 and a third set of fixed electrodes 118; capacitor $C_4$ is formed between the proof mass 104 and a fourth set of fixed electrodes 120. The capacitance of each capacitor depends on the distance between the corresponding fixed electrode and the corresponding portion of the proof-mass. The corresponding capacitance changes due to motion of the corresponding proof-mass caused by acceleration or anchor motion, for example.

Although "electrodes" are utilized herein, electrodes are used as an example to facilitate understanding the output cancelling mechanism. The example capacitive electrodes are not intended to be limiting. A person having skill in the art would understand that different types of transducers could be employed in the place of the capacitive electrodes (e.g., piezoelectric transducers or piezoresistors). Additionally or alternatively, a person having ordinary skill in the art would understand that the "electrodes" need not be electrodes at all. Optical transducers, for example, can be employed to measure deflections of the proof mass.

Signals associated with capacitors $C_1$, $C_2$, $C_3$ and $C_4$ are input into electronics (not shown). According to an embodiment, the electronics can include a signal processor. According to an embodiment, the output signal is a linear combination of signals $S_1$, $S_2$, $S_3$ and $S_4$ that are associated with capacitors $C_1$, $C_2$, $C_3$ and $C_4$. For example, the output signal ($S_{output}$) can be:

$$S_{output} = (S_1 - S_2) - (S_3 - S_4),$$

where $S_1$, $S_2$, $S_3$, and $S_4$ depend on the associated capacitance and a gain factor associated with respective capacitors, such that:

$$S_{output} = (a_1 * C_1 - a_2 * C_2) - (a_3 * C_3 - a_4 * C_4),$$

where $a_1$, $a_2$, $a_3$, $a_4$ are gain factors associated with each capacitor.

In the case of no acceleration and no anchor motion, all signals $S_1$, $S_2$, $S_3$ and $S_4$ have the same magnitude, for example:

$$S_1 = S_2 = S_3 = S_4 = S_0$$

Accordingly, in the example case of no anchor motion and no acceleration the output signal is:

$$S_{output} = (S_0 - S_0) - (S_0 - S_0) = 0$$

Figure 4:
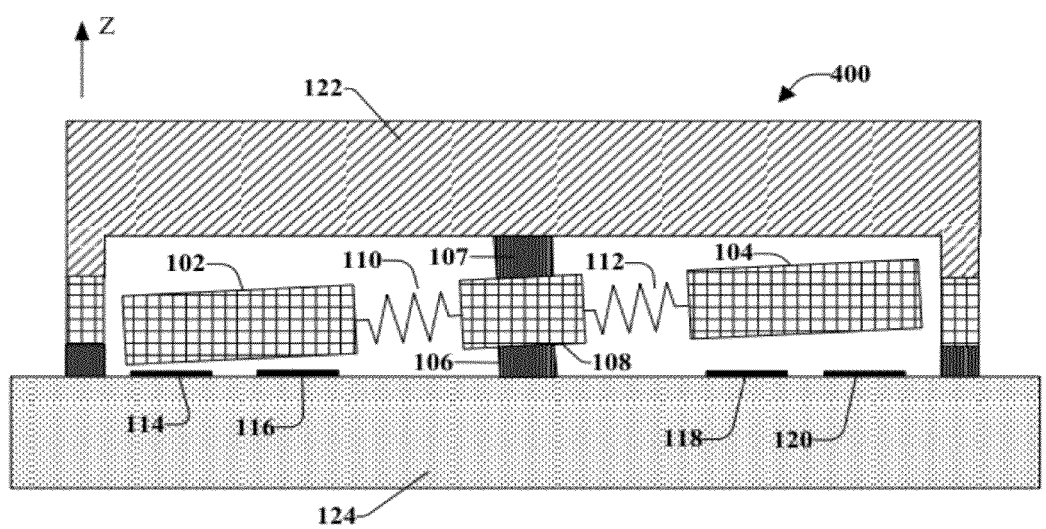
FIG. 4 is a schematic block diagram illustration of a cross section of an example Z accelerometer with two proof masses attached to a top and bottom substrate undergoing anchor motion.

Unlike traditional accelerometers, accelerometer 100 can distinguish between acceleration and anchor motion. FIG. 4 is a schematic illustration of the accelerometer undergoing anchor motion 400.

When the accelerometer experiences anchor motion 400 due to sources such as temperature change, packaging stress, material creep, mechanical shock, and the like, the first proof mass 102 and the second mass 104 experience equal deflections in the opposite directions. Because the capacitances of $C_1$, $C_2$, $C_3$ and $C_4$ depend on the distance between the corresponding fixed electrode and the corresponding proof mass, the capacitances of $C_1$ and $C_2$ increase, while the capacitances of $C_3$ and $C_4$ decrease. As a non-limiting illustration, the change in the outer capacitors' signals can be defined as twice the change in the inner capacitors signals: $S_1=S_0+2\Delta$, $S_2=S_0+\Delta$, $S_3=S_0-\Delta$, and $S_4=S_0-2\Delta$, where $\Delta$ is the change in inner capacitors signals due to corresponding change in distance. In other words, according to the embodiment, the change in $S_1$ is equal and opposite to the change in $S_4$; and the change in $S_2$ is equal and opposite to the change in $S_3$. Accordingly, for the example case of anchor motion without acceleration:

$$S_{output}=(S_1-S_2)-(S_3-S_4)=(S_0+2\Delta+S_0-\Delta)-(S_0-\Delta-S_0+2\Delta)=0$$

The output signal is zero, indicating that accelerometer is insensitive to the anchor motion.

The accelerometer 100 has a capacitive output of zero when exposed to anchor motion, but the accelerometer 100 has a non-zero capacitive output proportional to acceleration when exposed to acceleration.

Figure 5:
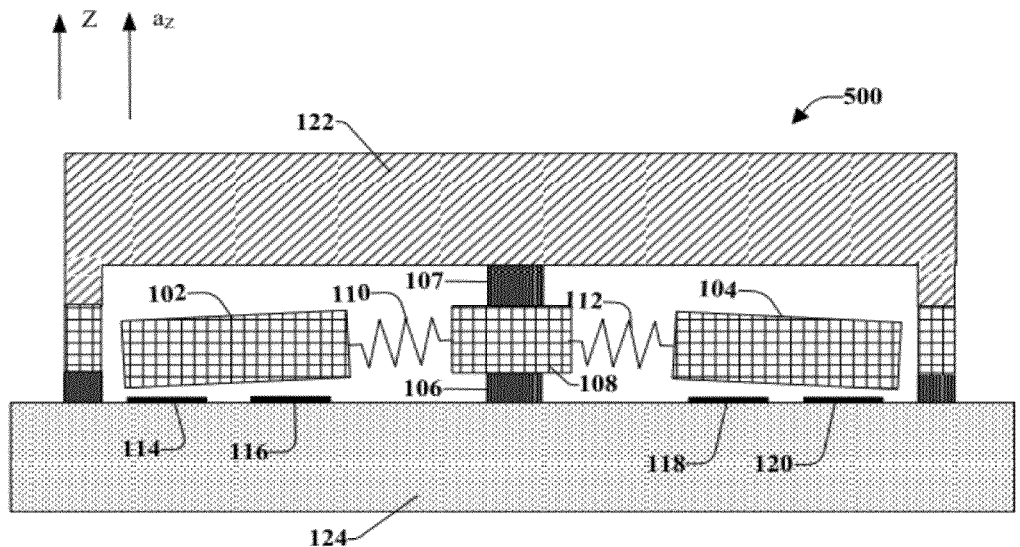
FIG. 5 is a schematic block diagram illustration of a cross section of an example Z accelerometer with two proof masses attached to a top and bottom substrate undergoing acceleration.

FIG. 5 illustrates an accelerometer undergoing acceleration 500 along a Z direction. When subjected to this acceleration, the first proof mass 102 and the second proof mass 104 can independently move in the same direction. The distances between the fixed electrodes 114-120 and the corresponding portion of proof mass 102 and proof mass 104 can change accordingly and generate capacitive signals proportional to the acceleration 500. Specifically, while values of capacitance measured by all the capacitors increase, values of capacitance measured by the outer capacitors $C_1$ and $C_4$ increase more than values of capacitance measured by the inner capacitors $C_2$ and $C_3$.

As a non-limiting illustration, the change in the signals associated with the outer capacitors can be defined as twice the change in the signals associated with the inner capacitors: $S_1=S_0+2\Delta$, $S_2=S_0+\Delta$, $S_3=S_0+\Delta$ and $S_4=S_0+2\Delta$.

The electronics (e.g., signal processor) can produce an output signal that is proportional to acceleration. According to an embodiment, the output signal is the same linear combination of the $S_1$, $S_2$, $S_3$ and $S_4$ described previously. Accordingly, for the case of acceleration 500:

$$S_{output}=(S_1-S_2)-(S_3-S_4)=(S_0+2\Delta-S_0-\Delta)-(S_0+\Delta-S_0-2\Delta)=2\Delta$$

The capacitive output signal $S_{ouput}$ changes, and the change in $S_{output}$ indicates acceleration.

Figure 6:
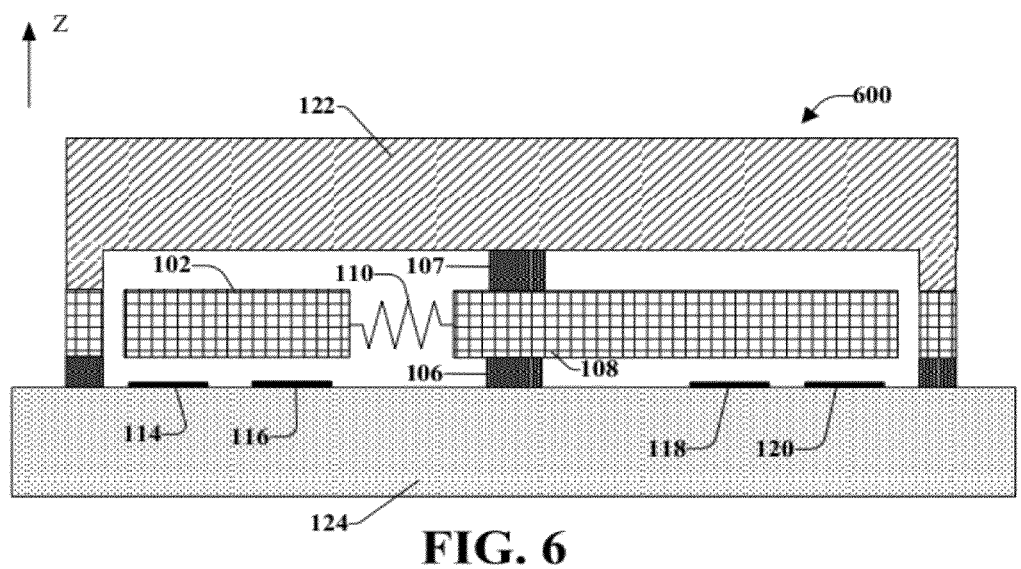
FIG. 6 is a schematic block diagram illustration of a cross section of an example Z accelerometer attached to a top and bottom substrate with a proof mass and a support structure not undergoing anchor motion or acceleration.

FIG. 6 illustrates a schematic illustration of another embodiment of an accelerometer 600 that also employs an offset cancelling mechanism. More specifically, FIG. 6 is a schematic illustration of a cross section of a Z-axis accelerometer with the Z-direction pointing up.

The accelerometer 600 can achieve employ a proof mass 102 and a support structure 108 attached to the mechanical anchors 106 and 107. The proof mass 102 is attached to the support structure 108 by a flexible member (e.g., a spring) 110. According to an embodiment, the mechanical anchor 106 can be attached to a bottom substrate 124 (like the accelerometer illustrated in FIG. 1). According to another embodiment, the mechanical anchor 107 can be attached to a top substrate 122 (like the accelerometer illustrated in FIG. 2). The support structure 108 can also be attached to both the top substrate 122 and the bottom substrate 112, according to another embodiment (like the accelerometer illustrated in FIG. 3).

Capacitor $C_1$ is formed between the proof mass 102 and a first set of fixed electrodes 114. Similarly, capacitor $C_2$ is formed between the proof mass 102 and a second set of fixed electrodes 116; capacitor $C_3$ is formed between the support structure 108 and a third set of fixed electrodes 118; capacitor $C_4$ is formed between support structure 108 and a fourth set of fixed electrodes 120. The capacitance of each capacitor depends on the distance between the corresponding fixed electrode and the corresponding portion of the proof-mass 102 or the corresponding portion of the support arm 108. The capacitance of $C_1$ and $C_2$ changes due to motion of the proof-mass caused by acceleration or anchor motion, for example. The capacitance of $C_3$ and $C_4$ changes due to motion of the support arm caused by anchor motion, for example.

Signals associated with $C_1$, $C_2$, $C_3$ and $C_4$ are input into electronics (not shown). According to an embodiment, the electronics can include a signal processor. According to an embodiment, the output signal ($S_{output}$) is a linear combination of $C_1$, $C_2$, $C_3$ and $C_4$. For example, the output signal ($S_{output}$) can be:

$$S_{output}=(S_1-S_2)-(S_3-S_4),$$

where $S_1$, $S_2$, $S_3$, and $S_4$ depend on the associated capacitance and a gain factor associated with respective capacitors, such that:

$$S_{output}=(a_1*C_1-a_2*C_2)-(a_3*C_3-a_4*C_4),$$

where $a_1$, $a_2$, $a_3$, $a_4$ are gain factors associated with each capacitor.

In the case of no acceleration and no anchor motion, all signals $S_1$, $S_2$, $S_3$ and $S_4$ have the same magnitude, for example:

$$S_1=S_2=S_3=S_4=S_0$$

Accordingly, in the example case of no anchor motion and no acceleration:

$$S_{output}=(S_1-S_2)-(S_3-S_4)=S_0-S_0-S_0+S_0=0$$

Figure 7:
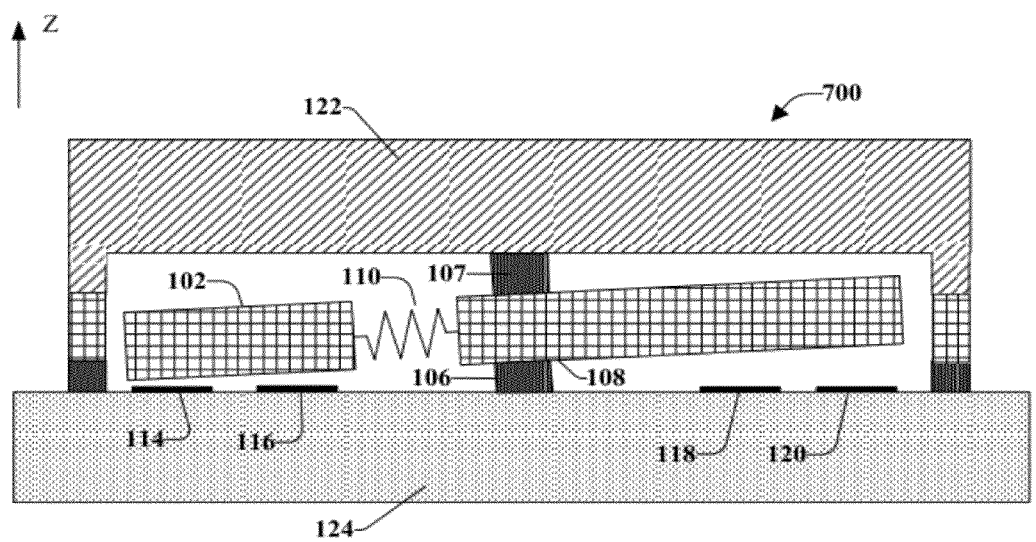
FIG. 7 is a schematic block diagram illustration of a cross section of an example Z accelerometer with a proof mass and a support structure attached to a top and bottom substrate undergoing anchor motion.

Accelerometer 600 can distinguish between acceleration and anchor motion. FIG. 7 is a schematic illustration of the accelerometer undergoing anchor motion 700. According to one embodiment, when the accelerometer experiences anchor motion, the proof mass 102 and the support structure 108 each experience a deflection of the same magnitude but in opposite directions. The values of capacitance measured by capacitors $C_1$ and $C_2$ depend on the distances between the corresponding electrodes and the corresponding portions of proof mass 102. The values of capacitance measured by capacitors $C_3$ and $C_4$ depend on the distances between the corresponding electrodes and the corresponding portion of support structure 108. Therefore, signals $S_1$ and $S_2$ increase, while signals $S_3$ and $S_4$ decrease. Signals $S_1$ and $S_4$ change by the same amount but in opposite directions. Similarly signals $S_2$ and $S_3$ also change by the same amount but in opposite direction. Since the proof mass 102 and the support structure 108 experience rotation, the outer capacitors $C_1$ and $C_4$ generally change more than the inner capacitors $C_2$ and $C_3$. As a non-limiting illustration, the change in the outer capacitors signals can be defined as twice the change in the inner capacitors signals:

$$S_1=S_0+2\Delta, S_2=S_0+\Delta, S_3=S_0-\Delta, \text{ and } S_4=S_0-2\Delta.$$

According to an embodiment, the output capacitive signal is the linear combination of the capacitances $C_1$, $C_2$, $C_3$ and $C_4$. For example, the output signal $S_{output}$ can be of the form:

$$S_{output}=(S_1-S_2)-(S_3-S_4).$$

Accordingly, for the case of anchor motion without acceleration:

$$S_{output}=(S_0+2\Delta-S_0-\Delta)-(S_0-\Delta-S_0+2\Delta)=0.$$

The output of the accelerometer is zero, which indicates that the device is insensitive to the anchor motion.

The accelerometer 600 has a capacitive output of zero when exposed to anchor motion due to sources other than acceleration, but the accelerometer 600 has a non-zero capacitive output proportional to acceleration when exposed to acceleration.

Figure 8:
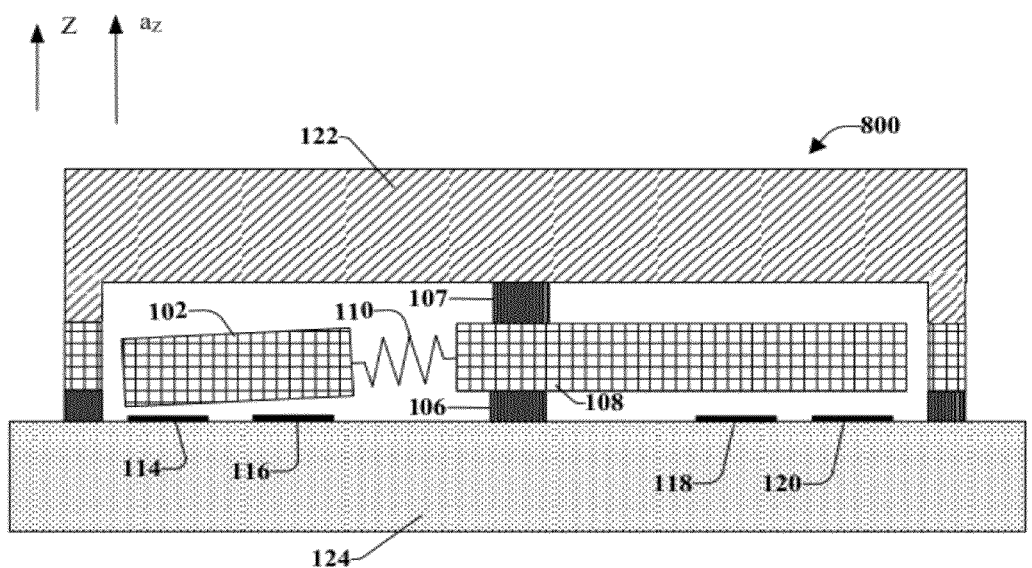
FIG. 8 is a schematic block diagram illustration of a cross section of an example Z accelerometer with a proof mass and a support structure attached to a top and bottom substrate undergoing acceleration.

FIG. 8 illustrates an accelerometer undergoing acceleration 800 along Z direction. When subjected to acceleration, the proof mass 102 independently moves because it is flexibly attached to the support structure, but the support structure 108 does not move because it's rigidly attached to the anchor. The distances between the fixed electrodes 114 and 116 and the corresponding portion of proof mass 102 can change accordingly and generate capacitive signals proportional to the acceleration. Specifically, in case of positive Z acceleration both capacitances $C_1$ and $C_2$ increase, while capacitances $C_3$ and $C_4$ remain the same.

Accordingly, as a non-limiting example, change in $S_1$ signal can be made twice as large as change in $S_2$ signal; therefore: $S_1=S_0+2\Delta$ and $S_2=S_0+\Delta$. The support structure 108 does not experience deflection, therefore $S_3=S_0$, and $S_4=S_0$.

The electronics (e.g., signal processor) can produce an output signal that is proportional to acceleration. According to an embodiment, the output signal is the linear combination of the capacitances $C_1$, $C_2$, $C_3$ and $C_4$. For example, the output capacitive signal $S_{output}$ can be of the form used previously while illustrating anchor motion case. Accordingly, for the case of acceleration:

$$S_{output}=(S_1-S_2)-(S_3-S_4)-(S_0+2\Delta-S_0-\Delta)-(S_0-S_0)=\Delta.$$

The output signal $S_{output}$ changes indicating acceleration.

Although FIGS. 1-8 illustrate an accelerometer that detects acceleration in the Z-direction, the same principles can be applied to create an accelerometer that senses acceleration in an X- and/or a Y-direction. Conventionally in the MEMS art, "X- and Y-accelerometer" refer to the device measuring acceleration parallel to the plane of the device.

Figure 9:
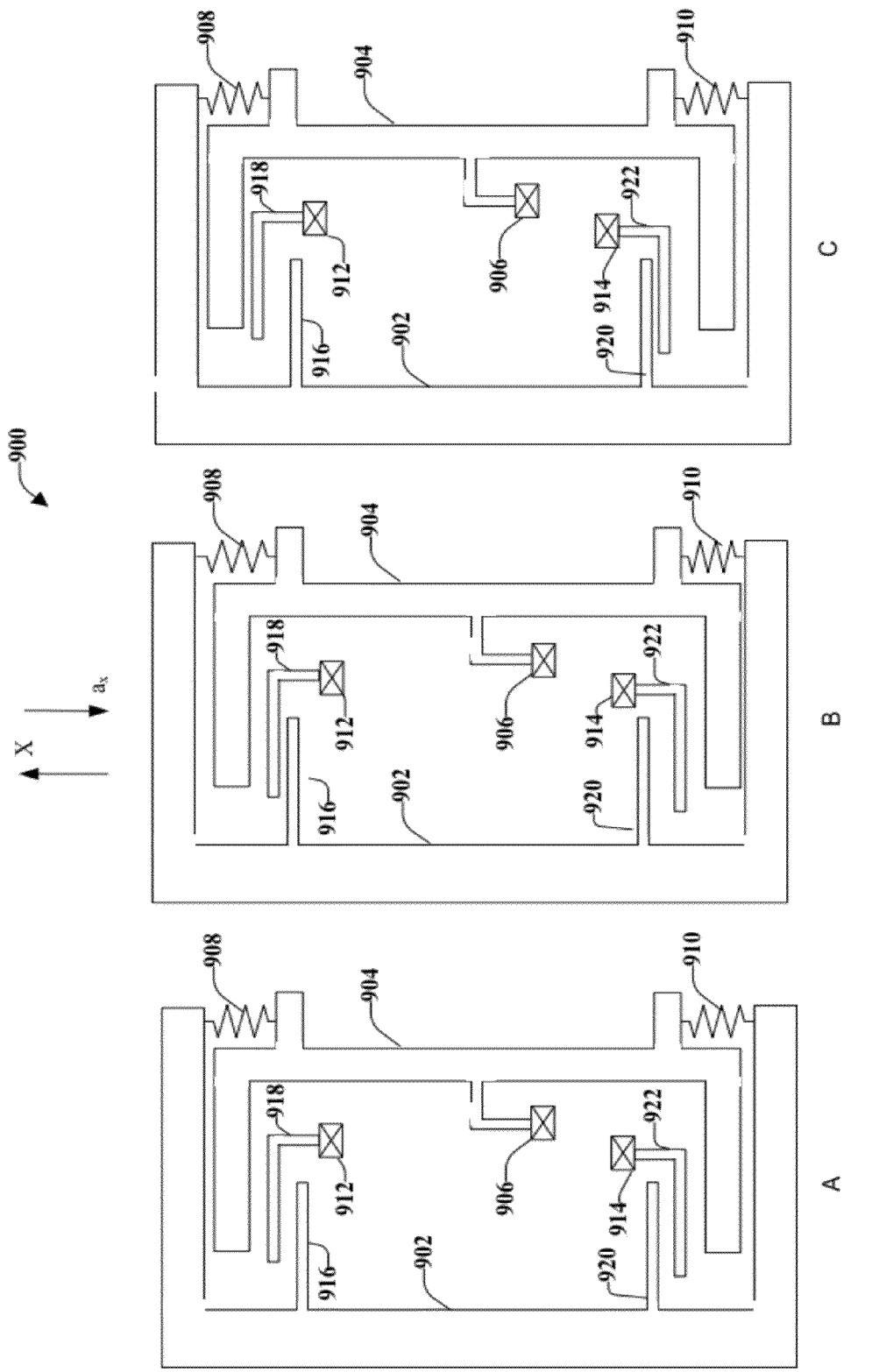
FIG. 9 is a schematic block diagram illustration of a cross section of an example accelerometer implemented as an X- or Y-accelerometer: (A) undisturbed; (B) undergoing acceleration; (C) undergoing anchor motion

FIG. 9 is a schematic illustration of an accelerometer 900 implemented as an X-axis accelerometer with an offset cancelling mechanism, according to an embodiment.

The accelerometer 900 can employ a proof mass 902 and a support structure 904. The accelerometer 900 can also include a first fixed electrode 918 attached to a first anchor 912 and a second fixed electrode 922 attached to a second anchor 914. The support structure 904 is attached to a third anchor 906. The proof mass 902 can be flexibly attached to the support structure 904 through springs 908 and 910.

According to an embodiment, the accelerometer can comprise four capacitors: a first capacitor $C_1$ is formed between a portion of support structure 904 and fixed electrode 918; a second capacitor $C_2$ is formed between proof-mass electrode 916 and fixed electrode 918; a third capacitor $C_3$ is formed between proof-mass electrode 920 and fixed electrode 922, and a fourth capacitor $C_4$ is formed between a portion of support structure 904 and fixed electrode 922. FIG. 9A illustrates the case of no acceleration and no anchor motion. In this case signals $S_1$, $S_2$, $S_3$ and $S_4$ associated with capacitors $C_1$, $C_2$, $C_3$ and $C_4$ can be made equal, for example:

$$S_1=S_2=S_3=S_4=S_0$$

According to the embodiment, the output capacitive signal is the linear combination of the capacitances $C_1$, $C_2$, $C_3$ and $C_4$. For example, the output capacitive signal $S_{output}$ can be of the form:

$$S_{output}=(S_1+S_2)-(S_3+S_4)$$

Therefore, in the example case of no acceleration and no anchor motion:

$$S_{output}=(S_1+S_2)-(S_3+S_4)=(S_0+S_0)-(S_0+S_0)=0.$$

The accelerometer 900 is sensitive to acceleration in the X-direction. As illustrated in FIG. 9B, in the event of X-axis acceleration acting along the negative X direction, the proof mass 902, which is flexibly attached to the support structure 904, moves in the positive X direction. In contrast, the support structure itself is rigidly attached to the anchor 906, and therefore doesn't move under acceleration. As a result, the capacitances $C_1$ and $C_4$ don't change, so the signals associated with capacitor $C_1$ and $C_4$ are $S_1=S_0$ and $S_4=S_0$; capacitor $C_2$ decreases, while capacitor $C_3$ increases. According to the embodiment the associated capacitive signals $S_2$ and $S_4$ change by the same amount $\Delta$, but in opposite directions. The output signal ($S_{output}$) can be a linear combination of capacitances $C_1$, $C_2$, $C_3$ and $C_4$:

$$S_{output}=(S_1+S_2)-(S_3+S_4)=(S_0+S_0+\Delta)-(S_0-\Delta+S_0)=2\Delta.$$

The output capacitance signal $S_{output}$ changes, which indicates acceleration.

The accelerometer 900 is insensitive to anchor motion due to sources other than acceleration. FIG. 9C illustrates motion of the anchors 912 and 914 in the positive X direction. As a result the capacitances of $C_1$ and $C_3$ increase, while the capacitances of $C_2$ and $C_4$ decrease. The output signal ($S_{output}$) is the linear combination presented in the example case of acceleration:

$$S_{output}=(S_1+S_2)-(S_3+S_4)$$

According to the embodiment, the changes in the capacitive signal $S_1$ and $S_3$ are equal but opposite in signs; similarly, the changes in the capacitive signal $S_2$ and $S_4$ are equal and opposite in sign, so that $$S_{output}=(S_0+\Delta+S_0-\Delta)-(S_0+\Delta+S_0-\Delta)=0.$$

As shown, the output capacitive signal, $S_{output}$, does not change under anchor motion from sources other than acceleration. This indicates that accelerometer 900 is insensitive to anchor motion.

FIG. 9C also illustrates case of anchor motion in the negative X direction due to sources other than acceleration. The accelerometer is similarly insensitive to such anchor motion due to sources other than acceleration.

Figure 10:
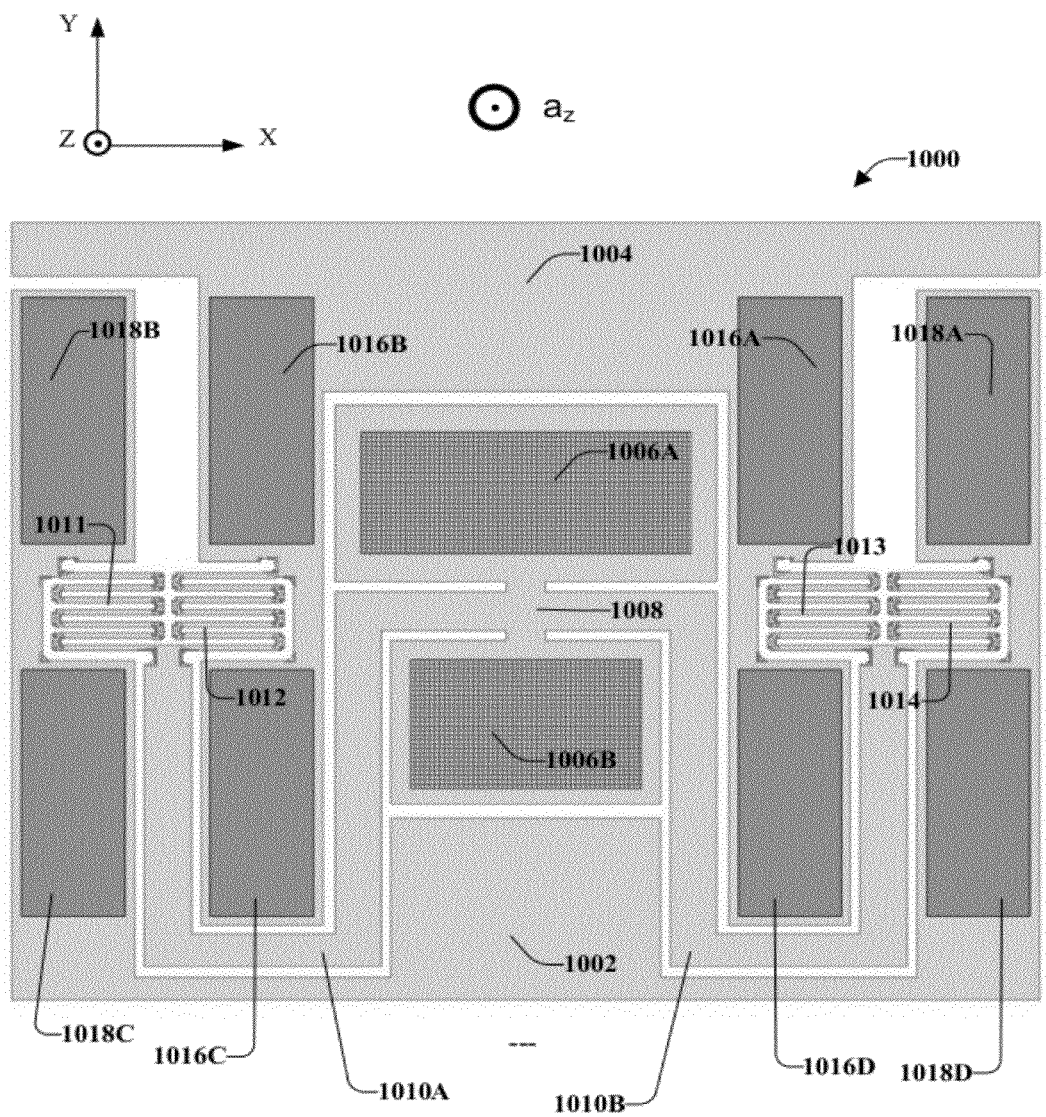
FIG. 10 is a schematic illustration of an exemplary embodiment of a Z accelerometer as a microelectromechanical system (MEMS) device.

FIG. 10 is a schematic illustration of an exemplary embodiment of a Z-axis accelerometer as a microelectromechanical system (MEMS) 1000. The accelerometer 1000 can include an offset cancelling mechanism as described above.

The accelerometer can include two proof masses: a proof mass 1002 and a proof mass 1004. The proof mass 1002 and the proof mass 1004 can be attached to two anchors 1006A and 1006B. According to an embodiment, between the two anchors 1006A and 1006B is a single point connection 1008 to which two support structures 1010A and 1010B are attached. According to an embodiment, the MEMS device 1000 can include four springs 1011, 1012, 1013 and 1014. Each support structure 1010a and 1010b loops around the lower half of the proof mass 1004 and connects to the corresponding springs 1011-1014.

An inner pair of springs 1012 and 1013 can carry the proof mass 1004. An outer pair of springs 1011 and 1014 can carry the proof mass 1002. Proof mass legs, the vertical part of the proof mass, are balanced with regard to the springs. Proof mass heads, horizontal parts of the proof masses, are attached to the legs to make each proof mass un-balanced and create torques acting in case of Z-direction acceleration. The said torques would cause rotation of the proof masses, such that proof mass heads are either moving towards or away from the substrate. This concept is illustrated in FIG. 5.

Underneath the proof-mass legs, fixed electrodes 1016A-D and 1018A-D are arranged to measure the proof mass motion. There are eight capacitors in the embodiment illustrated in FIG. 10: capacitor $C_1$ is formed between fixed electrode 1016A and the proof mass 1004; capacitor $C_2$ is formed between fixed electrode 1016B and the proof mass 1004; capacitor $C_3$ is formed between fixed electrode 1016C and the proof mass 1004; capacitor $C_4$ is formed between fixed electrode 1016D and the proof mass 1004; capacitor $C_5$ is formed between fixed electrode 1018A and the proof mass 1002; capacitor $C_6$ is formed between fixed electrode 1018B and the proof mass 1002; capacitor $C_7$ is formed between fixed electrode 1018C and the proof mass 1002; capacitor $C_8$ is formed between fixed electrode 1018D and the proof mass 1002. The capacitance of each capacitor depends on the distance between the corresponding fixed electrode and the corresponding portion of the proof-mass. The corresponding capacitance changes due to motion of the corresponding proof-mass caused by acceleration or anchor motion, for example.

Signals associated with each capacitor $C_1$-$C_8$ are input into electronics, such as a signal processor (not shown). According to an embodiment, the output capacitive signal is a linear combination of the capacitances $C_1$-$C_8$. For example, the output capacitive signal $S_{output}$ can be:

$$S_{output}=(S_1-S_4)+(S_2-S_3)+(S_8-S_5)+(S_7-S_6),$$

where signals $S_1$-$S_8$ depend on the associated capacitance and a gain factor associated with respective capacitors.

In the case of no acceleration and no anchor motion, all capacitive signals $S_1$-$S_8$ are equal, for example:

$$S_1=S_2=S_3=S_4=S_5=S_6=S_7=S_8=S_0$$

In case of acceleration along the positive Z direction both proof mass 1002 and 1004 deflect towards the substrate. The capacitance values of $C_1$-$C_8$ are determined by the corresponding distances between the corresponding proof masses and the corresponding fixed electrodes. Therefore, capacitances of $C_1$, $C_2$, $C_7$, and $C_8$ increase, and capacitances of $C_3$, $C_4$, $C_5$, and $C_6$ decrease. As an example, the change in the capacitive signals $\Delta$ can be made equal for all signals $S_1$-$S_8$:

$$S_1=S_0+\Delta;$$
$$S_2=S_0+\Delta;$$
$$S_3=S_0-\Delta;$$
$$S_4=S_0-\Delta;$$
$$S_5=S_0-\Delta;$$
$$S_6=S_0-\Delta;$$
$$S_7=S_0+\Delta;$$
$$S_8=S_0+\Delta;$$

Therefore, in case of Z-direction acceleration and no anchor motion, the output signal is:

$$S_{output}=(S_0+\Delta-S_0+\Delta)+(S_0+\Delta-S_0+\Delta)+(S_0+\Delta-S_0+\Delta)+(S_0+\Delta-S_0+\Delta)=8\Delta.$$

As illustrated in FIG. 4, when accelerometer 1000 undergoes anchor motion, both proof masses 1002 and 1004 rotate about an in-plane axis. Therefore, the two proof mass heads move in opposite directions. The value of the capacitances is determined by the corresponding distances between the corresponding proof mass portions and the corresponding fixed electrodes, therefore, capacitances $C_1$, $C_2$, $C_5$, and $C_6$ decrease, while capacitances $C_3$, $C_4$, $C_7$, and $C_8$ increase. According to the embodiment, the change in the capacitive signals $\Delta$ can be made equal for all signals $S_1$-$S_8$, so that:

$$S_1=S_0-\Delta;S_2=S_0-\Delta;S_3=S_0+\Delta;S_4=S_0+\Delta;S_5=S_0-\Delta;$$
$$S_6=S_0-\Delta;S_7=S_0+\Delta;S_8=S_0+\Delta;$$

According to the embodiment the output signal is the same linear combination of signals $S_1$-$S_8$ as was used to illustrate the case of acceleration $$S_{output}=(S_1-S_4)+(S_2-S_3)+(S_8-S_5)+(S_7-S_6)$$

Therefore, in case of no acceleration, but anchor motion, the output signal is zero $$S_{output}=(S_0-\Delta-S_0-\Delta)+(S_0-\Delta-S_0-\Delta)+(S_0+\Delta-S_0+\Delta)+(S_0+\Delta-S_0+\Delta)=0$$

The fact that output is zero indicates that Z-accelerometer 1000 is insensitive to anchor motion due to sources other than acceleration.

While the various embodiments have been described in connection with the various figures, it is to be understood that other similar embodiments may be used or modifications and additions may be made to the described embodiments for performing the same function without deviating from the spirit of the embodiments. Therefore, the present innovation should not be limited to any single embodiment, but rather should be construed in breadth and scope in accordance with the appended claims.

What is claimed is:

1. An accelerometer, comprising:
a mechanical structure, comprising:
a substrate;
an anchor coupled to the substrate;
a support arm rigidly coupled to the anchor; and
a first proof mass flexibly coupled to the support arm, wherein the first proof mass moves in response to acceleration of the accelerometer;
a first transducer configured to measure a first distance between a first reference area and a first portion of the mechanical structure;
a second transducer configured to measure a second distance between a second reference area and a second portion of the mechanical structure, the first portion of the mechanical structure being a portion of the first proof mass and the second portion of the mechanical structure being a portion of the support arm;
a signal processing circuit, coupled to the first transducer and the second transducer, is configured to measure the acceleration, wherein the signal processing circuit determines the motion of the first proof mass relative to the support arm.

2. The accelerometer of claim 1, wherein
the first transducer comprises a variable capacitor formed by a first fixed electrode and the first portion of the mechanical structure; and the second transducer comprises a variable capacitor formed by a second fixed electrode and the second portion of the mechanical structure.

3. The accelerometer of claim 1, wherein the mechanical structure further comprises a second proof mass flexibly coupled to the support arm that moves in response to acceleration.

4. The accelerometer of claim 3, wherein
the first portion of the mechanical structure is a portion of the first proof mass, and
the second portion of the mechanical structure is a portion of the second proof mass.

5. The accelerometer of claim 1, wherein
the mechanical structure is disposed in a plane;
the first proof mass is configured to rotate out of the plane in response to acceleration normal to the plane;
the first transducer is configured to measure the first distance normal to the plane; and
the second transducer is configured to measure the second distance normal to the plane.

6. The accelerometer of claim 1, wherein
the mechanical structure is disposed in a plane;
the first proof mass is configured to move in a first direction in the plane in response to acceleration in the first direction;
the first transducer is configured to measure the first distance in the first direction; and
the second transducer is configured to measure the second distance in the first direction.

7. The accelerometer of claim 1, wherein
the mechanical structure is disposed in a plane; and
the substrate is disposed parallel to the plane below the mechanical structure.

8. The accelerometer of claim 7, further comprising a top substrate disposed parallel to the plane above the mechanical structure and coupled to the anchor.

9. An accelerometer, comprising:
a mechanical structure, comprising:
    a substrate;
    an anchor coupled to the substrate;
    a support arm coupled to the anchor; and
    a first proof mass flexibly coupled to the support arm that moves in response to
acceleration, the first portion of the mechanical structure being a portion of the first proof mass and the second portion of the mechanical structure being a portion of the support arm;
a first electrode configured to measure a first distance between a first reference area and a first portion of the mechanical structure;
a second electrode configured to measure a second distance between a second reference area and a second portion of the mechanical structure;
a signal processing circuit coupled to the first electrode and the second electrode configured to produce an output responsive to acceleration and not responsive to anchor motion.

10. The accelerometer of claim 9, wherein
the mechanical structure is disposed in a plane;
the first proof mass is configured to rotate out of the plane in response to acceleration normal to the plane;
the first electrode is configured to measure the first distance normal to the plane; and
the second electrode is configured to measure the second distance normal to the plane.

11. The accelerometer of claim 9, wherein
the mechanical structure is disposed in a plane;
the first proof mass is configured to move in a first direction in the plane in response to acceleration in the first direction;
the first electrode is configured to measure the first distance in the first direction; and
the second electrode is configured to measure the second distance in the first direction.

12. The accelerometer of claim 9, wherein
the mechanical structure is disposed in a plane; and
the substrate is disposed parallel to the plane below the mechanical structure.

13. The accelerometer of claim 12, further comprising a top substrate disposed parallel to the plane above the mechanical structure and coupled to the anchor.

14. The accelerometer of claim 9, wherein the support arm is rigid.

15. The accelerometer of claim 9, wherein the support arm is flexible.

16. The accelerometer of claim 9, wherein the mechanical structure further comprises a second proof mass flexibly coupled to the support arm that moves in response to acceleration.

17. The accelerometer of claim 16, wherein
the first portion of the mechanical structure is a portion of the first proof mass; and
the second portion of the mechanical structure is a portion of the second proof mass.

18. An accelerometer, comprising:
means for measuring a first distance between a first reference area and a first portion of a mechanical structure, wherein the mechanical structure comprises a substrate, an anchor coupled to the substrate, a support arm rigidly coupled to the anchor, and a first proof mass flexibly coupled to the support arm that moves in response to acceleration;
means for measuring a second distance between a second reference area and a second portion of the mechanical structure, the first portion of the mechanical structure being a portion of the first proof mass and the second portion of the mechanical structure being a portion of the support arm; and
means for generating an output responsive to acceleration and not responsive to anchor motion.

19. The accelerometer of claim 2, wherein the first fixed electrode is disposed between the first proof mass and the substrate, the second fixed electrode is disposed between the support arm and the substrate.

* * * * *